(12) United States Patent
Fang et al.

(10) Patent No.: US 7,023,497 B2
(45) Date of Patent: Apr. 4, 2006

(54) CLAMPING CIRCUIT WITH WIDE INPUT DYNAMIC RANGE FOR VIDEO OR OTHER AC COUPLED SIGNALS

(75) Inventors: Lieyi Fang, Plano, TX (US); Haydar Bilhan, Dallas, TX (US); Gonggui Xu, Plano, TX (US); Ramesh Chandrasekaran, Plano, TX (US); Feng Ying, Plano, TX (US); Erkan Bilhan, Dallas, TX (US); Jason Meiners, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 695 days.

(21) Appl. No.: 10/210,473

(22) Filed: Jul. 31, 2002

(65) Prior Publication Data

US 2004/0021796 A1 Feb. 5, 2004

(51) Int. Cl.
  *H04N 5/16* (2006.01)
(52) U.S. Cl. ...................... 348/694; 348/691
(58) Field of Classification Search ............... 348/691, 348/695, 696, 697, 698; H04N 5/16, 5/18
  See application file for complete search history.

(56) References Cited

U.S. PATENT DOCUMENTS 4,114,179 A * 9/1978 Ilieve .......................... 348/692
5,260,794 A * 11/1993 Sase et al. ................... 348/695
5,508,749 A * 4/1996 Matsuo ........................ 348/500
5,760,844 A * 6/1998 Jorden ......................... 348/691
5,986,719 A    11/1999 Nakamura
5,995,166 A    11/1999 Kawano
6,204,892 B1   3/2001 Kawano

* cited by examiner

*Primary Examiner*—Michael H. Lee
(74) *Attorney, Agent, or Firm*—J. Dennis Moore; W. James Brady, III; Frederick J. Telecky, Jr.

(57) ABSTRACT

A clamping circuit disclosed herein has two modes of operation which include both a bottom level and mid-level clamping mode for clamping automatically onto the sync tip of a video signal and customizably clamping onto the front porch, back porch/pedestal or anywhere within the signal. The clamping circuit (400) includes a clamping capacitor (404) that couples to an automatic clamping circuit portion (405) to automatically clamp the synchronization pulse of the video input signal to a first predetermined reference voltage ($V_{ref1}$) of a first clamping pulse signal during an automatic clamping mode of operation. The automatic clamping portion (405) connects to the customizable clamping circuit portion (411) to clamp any portion of the video input signal to a second predetermined reference voltage ($V_{ref2}$) of a second clamping pulse signal during a customizable clamping mode of operation. A buffer (416) connects between the customizable clamping circuit portion and the output node of the clamping circuit.

9 Claims, 3 Drawing Sheets

CLAMPING CIRCUIT WITH WIDE INPUT DYNAMIC RANGE FOR VIDEO OR OTHER AC COUPLED SIGNALS

FIELD OF THE INVENTION

The present invention relates to video processing and, more particularly, to a clamping circuit and sync tip clamp processing for clamping a video signal.

BACKGROUND OF THE INVENTION

Video signals may be transmitted by cable, microwave, telephone systems, fiber optic, infrared, etc. for satellite, television, VCR, and other video capture equipment and applications. Conventional video equipment generates a composite video signal that includes synchronizing and video information in one signal. As shown in FIG. 1A, a composite video signal comprises a synchronization pulse or sync tip, a front porch including a color burst, and a back porch or pedestal. Characteristically, video signals have a built in synchronization or sync pulse to enable the video signal instrumentation to synchronize the signal such that it is shifted to a particular DC level. The sync pulse is repeated for each scan line of an image and has an undetermined DC level. Since, in many applications, only one power supply is used, the signal level entering the system must be above the ground level. Therefore, a clamping circuit is needed to clamp the lowest level of the video signal to a certain DC level to fully recover the incoming video signal. Illustrated in FIG. 1b is a known clamp pulse generated for a clamping circuit which is used to clamp onto the lowest level of the video signal shown in FIG. 1a. For many applications, clamping automatically must be performed in the analog domain such that the sync pulse is clamped. Thereafter, a separate clamping circuit is used to clamp the voltage at the pedestal, front porch or any other user-defined level.

FIG. 2 illustrates a typical application wherein an analog video signal is applied to the input pin 201 of the video processing integrated circuit 200 through an clamping capacitor or AC coupling capacitor 202. To enable the video signal to be processed, a clamping circuit 204 is used to establish a signal reference level of the incoming video signal to the dynamic input range of the video processing circuit 206. In other words, a DC reference is provided for the filtered video signal so that the ADC 206 outputs a digital word representing zero when the level of the filtered video signal is at its lowest point; thus, maximum headroom and consistent signal processing are provided. In other words, the DC value of the bottom level of the sync pulse is such that the output of the ADC 206 is equal to a digital zero level output code. This level shifted signal can then be processed by a digital signal processor DSP 208 to produce a digital output. Optionally, a digital to analog converter 210 may supply an analog output. As a result, the analog input video signal will not be distorted or clipped due to the DC offset of the input being out of range with the input dynamic range of the ADC 206. Furthermore, the level shifted signal needs to refer to a known value independent of the DC offset of the video signal input.

A known clamping circuit 300 as shown in FIG. 3, as is disclosed in U.S. Pat. No. 5,986,719 which is incorporated by reference herein, input 302 connects to clamping capacitor 304. Clamping capacitor 304 couples to a clamping node 306. Clamping node 306 connects to diode 308 which couples between the voltage reference $V_{ref}$ and clamping node 206. Finally a buffer 310 having a gain A couples to the clamping node 306. In operation, when the sync pulse pulls the voltage at node 306 low, diode 308 turns on and maintains the voltage level of node 204 equal to the reference voltage $V_{ref}$ minus the base-emitter voltage $V_{be}$ where base-emitter voltage $V_{be}$ is the p-n junction voltage drop across diode 308 when it is on. Reference voltage $V_{ref}$ is set such that $A*(V_{ref}-V_{be})$ is equal to the zero reference digital level of an analog to digital converter (ADC, not shown) coupled to buffer 310. At the end of the sync pulse, the positive-going edge turns diode 308 off and node 306 floats in response to the filtered input video signal. Unless the voltage at node 306 is less than the reference voltage $V_{ref}$ prior to clamping, proper clamping will not occur. Another disadvantage is that a leakage current associated with diode 308 causes the DC level to drop during the horizontal scan of a video signal. Even though the purpose of the leakage current is to ensure that the voltage at node 306 is lower than the reference voltage $V_{ref}$, the leakage current tends to differ from diode to diode; thereby affecting the accuracy of any connecting ADC (not shown).

Another approach incorporates the use of a feedback loop and are disclosed in U.S. Pat. Nos. 5,995,166 and 5,986,719 which are incorporated by reference herein. When utilizing feedback loops, however, the system must rely on shorting the output of an amplifier with the clamp reference level output to the clamping capacitor, which requires high power consumption due to the amplifier and causes instability and settling issues.

There still exists a need for a clamping circuit having two modes of operation which include both a bottom level and mid-level clamping mode. Furthermore, the clamping circuit must eliminate the use of a feedback loop. The clamping circuit must be able to correct the DC level without causing line noise. Also for low voltage single power supply applications, the clamping circuit needs to allow maximum dynamic range to the input. This clamping circuit must eliminate the need for a voltage reference circuit such that the reference voltage may be as low as ground. Moreover, the clamping circuit must provide a consistent supply of leakage current and; thereby, increase reliability.

SUMMARY OF THE INVENTION

To address the above-discussed deficiencies of the clamping circuits for video signal processing, the present invention teaches a clamping circuit including a clamping capacitor that couples to an automatic clamping circuit portion to automatically clamp the synchronization pulse of the video input signal to a first predetermined reference voltage of a first clamping pulse signal during an automatic clamping mode of operation. The automatic clamping portion connects to the customizable clamping circuit portion to clamp any portion of the video input signal to a second predetermined reference voltage of a second clamping pulse signal during a customizable clamping mode of operation. A buffer connects between the customizable clamping circuit portion and the output node of the clamping circuit.

In a first embodiment, the automatic clamping circuit includes a comparator having a first input that couples to receive the first clamping pulse signal and a second input coupled to the clamping capacitor. The output of the comparator connects to a gate of a transistor, where the source of the transistor connects to the power supply and the drain of the transistor connects to the clamping capacitor. A current source connects between the clamping capacitor and ground.

The customizable clamping circuit in this embodiment includes a second transistor having a gate coupled to receive the second clamping pulse signal, a source coupled to the power supply, and a drain coupled to the output node of the clamping circuit.

In another embodiment, the automatic clamping circuit includes a comparator having a first input coupled to a first level shift circuit which couples to a first reference voltage input. A second level shift circuit coupled between the second input of the comparator and the clamping capacitor. A first transistor includes a gate coupled to the output of the comparator, a source coupled to the power supply, and a drain coupled to the clamping capacitor. Further, a current source connects between the clamping capacitor and ground. The customizable clamping circuit in this embodiment is the same implementation as in the first embodiment.

In a third embodiment, the automatic clamping circuit includes a first resistor coupled to the clamping capacitor. A comparator includes a first input connected to a first level shift circuit that connects to ground. The comparator also includes a second input connected to a second level shift circuit which connects to the first resistor. A first transistor includes a gate couples to the output of the comparator and a source coupled to the power supply. A second transistor includes a gate couples to receive a first clamping pulse signal, the drain coupled to drain of the first transistor. A second resistor coupled between the clamping capacitor and the source of the second transistor. A third transistor includes a gate couples to receive the first clamping pulse signal and a drain couples to the second resistor. A current source couples between the source of the third transistor and ground.

In yet another embodiment, the automatic clamping circuit includes a first multiplexing circuit portion that connects between the clamping capacitor and the output node. A first level shift circuit connects to the first multiplexing circuit portion. A comparator including a first input connecting to the first level shift circuit. A second level shift circuit couples between the second input of the comparator and ground. A first transistor includes a gate connected to the output of the comparator and a source connected to the power supply. A second multiplexing circuit portion connects between the drain of the first transistor and the clamping capacitor.

Advantages of this design include but are not limited to a clamping circuit having two modes of operation which include both a bottom level and mid-level clamping mode but also to a clamping circuit having no feedback loop. Furthermore, the clamping circuit provides a consistent supply of leakage current and corrects the DC level without causing line noise. Also, the clamping circuit allows maximum dynamic range to the input. This clamping circuit eliminates the need for a voltage reference circuit such that the reference voltage may be as low as ground. Moreover, multiplexed input may be connected to the clamping circuit without causing any oscillation issues.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENTS

Figure 1A:
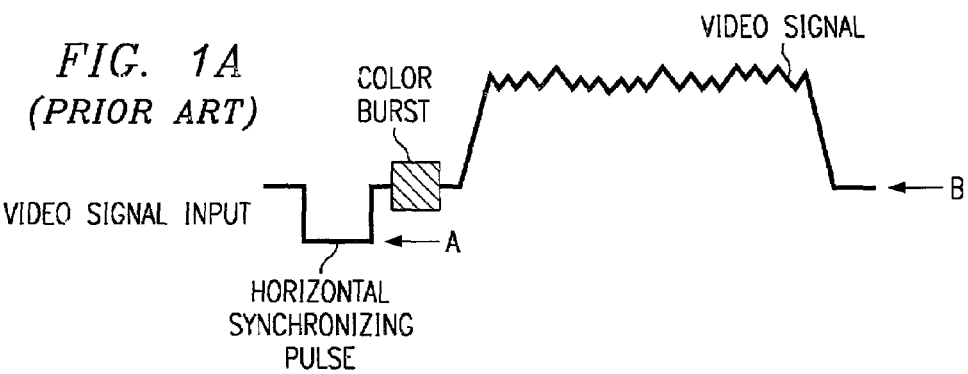
FIG. 1a is a diagram of a known composite video signal.
Figure 1B:
FIG. 1b is a diagram of a known clamp pulse.
Figure 2:
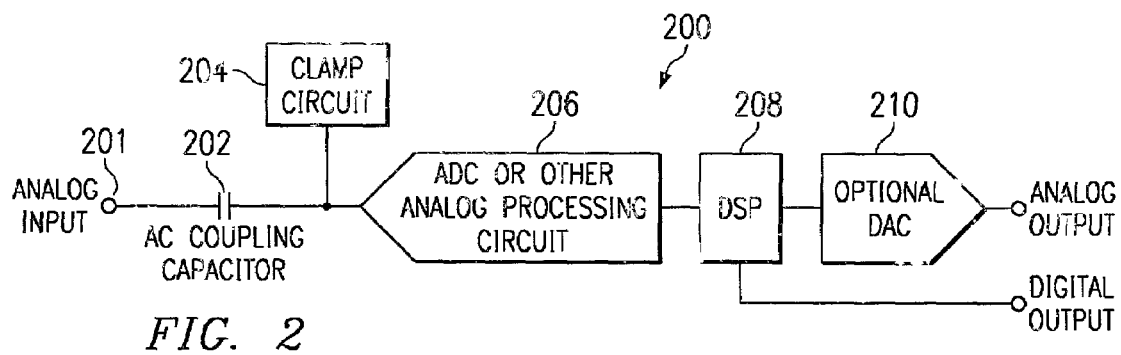
FIG. 2 illustrates a block diagram of a known application for processing a video signal.
Figure 3:
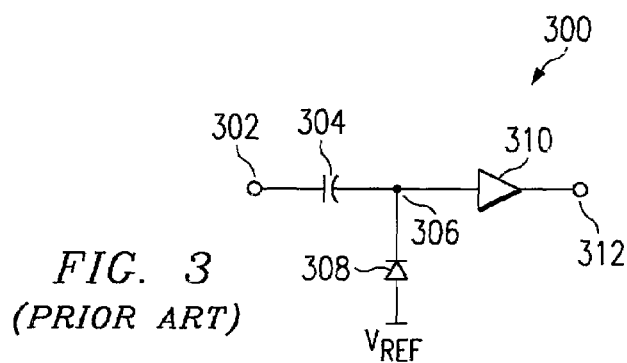
FIG. 3 displays a known clamping circuit.
Figure 4:
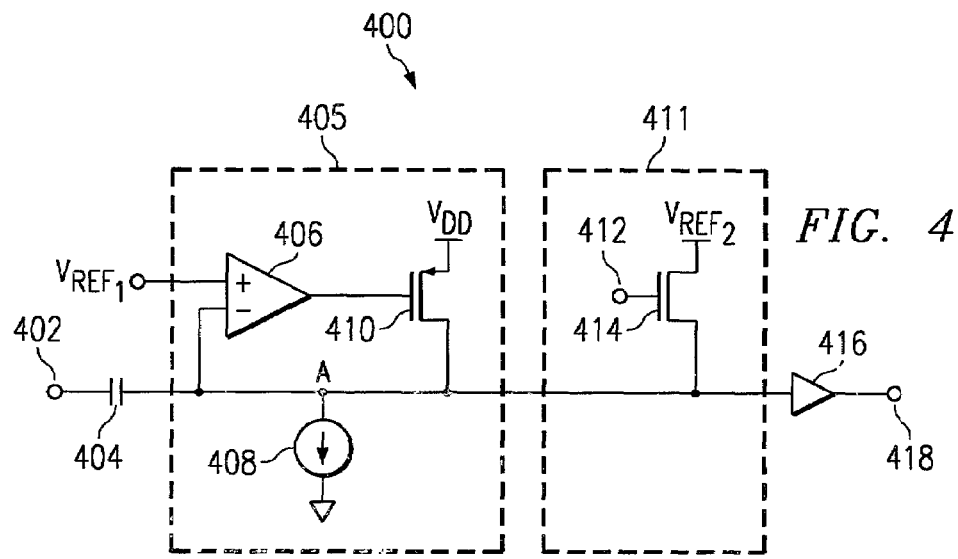
FIG. 4 shows a first embodiment of a clamping circuit in accordance with the present invention.

In accordance with the present invention, a first embodiment of the clamping circuit 400 is illustrated in FIG. 4 includes an input node 402 coupled to a clamping capacitor 404. An automatic clamping circuit portion 405 includes a comparator 406 which compares and amplifies the voltage difference between the predetermined reference voltage $V_{ref}$ and the video signal input voltage stored in capacitor 404. The automatic clamping circuit portion 405 automatically clamps the synchronization pulse of the video input signal to a first predetermined reference voltage of a first clamping pulse signal during an automatic clamping mode of operation. A first input of comparator 406 coupled to receive the first clamping pulse signal $V_{ref}$ and a second input coupled to the clamping capacitor 404. The amplified voltage difference from the output of comparator 406 is applied to the gate of transistor 410. The source of transistor 410 couples to the power supply and the drain connects to the clamping capacitor 404. Current source 408 couples to the clamping capacitor 404 to supply a constant supply of leakage current such that the lowest level is charged to a higher value than the clamp voltage reference $V_{ref}$. The automatic clamping portion 405 connects to the customizable clamping circuit portion 411 to clamp any portion of the video input signal to a second predetermined reference voltage $V_{ref2}$ of a second clamping pulse signal during a customizable clamping mode of operation. The customizable clamping circuit portion 411 includes a transistor 414 which couples to receive the second clamping pulse signal at its gate. The source of transistor 414 connects to the power supply. Buffer 416 connects between the customizable clamping circuit portion 411 and the output node of the clamping circuit 418. Note, buffer 416 is not a critical element necessary for the first embodiment 400 to operate correctly.

In operation clamping circuit 400 provides two clamping modes operation, automatic clamping mode and customizable clamping mode. When the system is powered up, a system will not have information concerning the location of the synchronization pulses and the offset of the video input signal may be out of the dynamic range of the system. Clamping circuit 400 clamps to a certain DC level in the automatic clamping mode such that all video signal information can be sent and processed by following signal processing circuits, such that the system acquires synchronization and recovers. During this mode, clamping circuit 400 operates continuously without requiring any external clamp pulses by simply processing the input signal. Whenever the signal applied to input 402 is lower than the clamp reference $V_{ref1}$, the automatic clamping circuit acts as an ideal diode that turns on and charges the clamping capacitor 404. Hence, the lowest point of the input signal applied to input 402 is automatically clamped to the desired clamp reference $V_{ref1}$. Comparator 406 senses the voltage at node A. If the voltage is lower than the comparator reference voltage $V_{ref1}$, then comparator 406 turns on transistor 410 to charge clamping capacitor 404. When any spikes or offsets in the lowest value of the voltage applied to the automatic clamping portion 405 that are larger than the clamp voltage reference $V_{ref1}$, clamping circuit 400 without current source 408 ceases to operate as an ideal diode. Therefore, current source 408 is used to provide a constant flow of current like a type of leakage current. The current supplied can be small enough such that, when the clamping circuit 400 is active, minimal error of one least significant bit (1 LSB) will exist in the connect analog-to-digital converter.

A digital signal processor (DSP—not shown) or any other circuit connected to output node 418 can process the input signal, disable the automatic clamping mode, and initiate the customizable clamping mode by supplying the second clamping pulse signal $V_{ref2}$. Transistor 414 shorts the input to the clamp reference. Second clamping pulse signal $V_{ref2}$ can be a programmable, variable voltage, a fixed internal or external voltage, or, simply, ground level. During the customizable clamping mode, mid-level clamping is enabled by simply setting the second clamping pulse signal $V_{ref2}$ to the half of the dynamic range of the input signal voltage.

Clamping circuit 400 provides a large signal swing in both the automatic and customizable clamping modes of operation. The reference voltage can be as low as ground instead of a certain voltage level. There is no need for a voltage reference circuit to adjust the clamp level. For a CMOS process, when the lowest signal level is ground, the video signal swing may be from 0 to $V_{DD}-(V_t+V_{dsat})$. For example, in a system having a 3 v power supply, the input video signal level may be 0 v to 2 v. Since high-speed digital circuitry generates large amounts of noise, large signal swing is preferred in conventional system solutions. The signal swing is proportional to signal to noise ratio. Thereby, a larger signal swing provides a larger signal to noise ratio and a better quality video.

Clamping circuit 400 provides a stable clamping level. In the automatic clamping mode, the signal and ground are level shifted and compared. Comparator 406 includes hysteresis and combines with the varying time constant to prevent potential oscillation when the video signal approaches ground level. In the customizable clamping mode, since only one transistor 414 is used to short the input to ground, there is virtually no feedback loop formed. Therefore, the system has no stability issue.

Figure 5A:
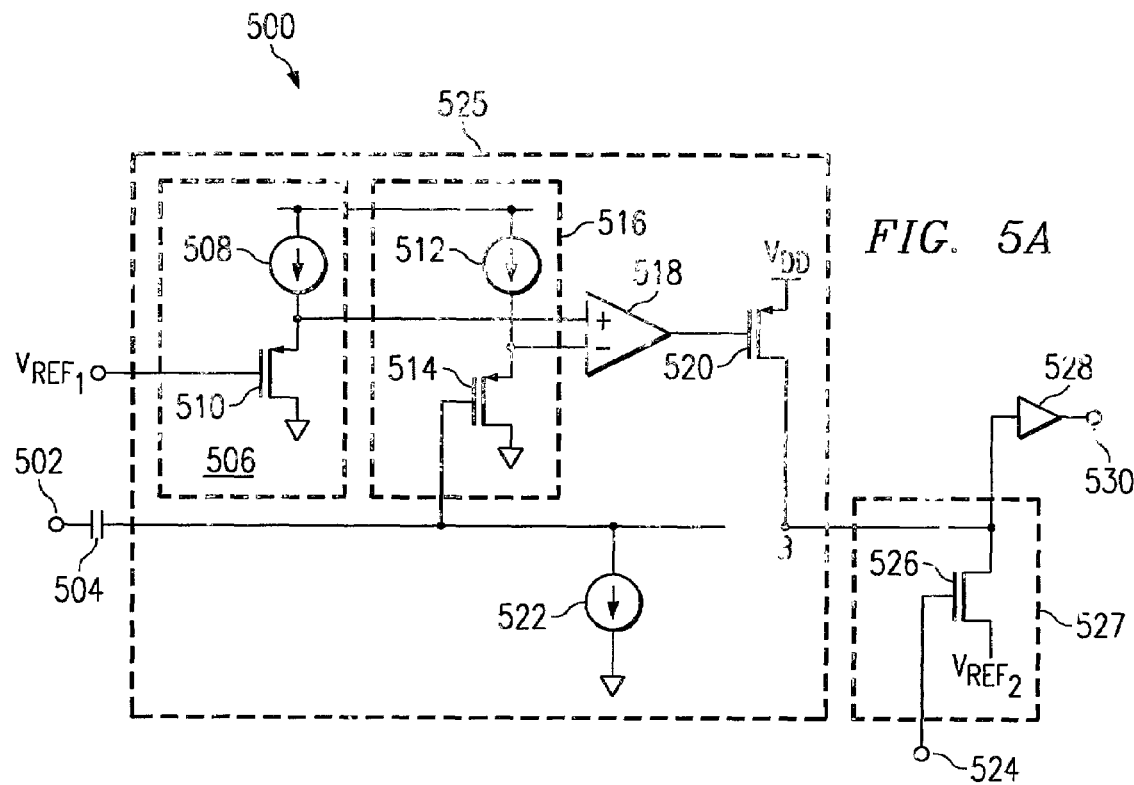
FIG. 5a illustrates a second embodiment of a clamping circuit in accordance with the present invention

FIG. 5a discloses a second embodiment of a clamping circuit 500 in accordance with the present invention, wherein the clamping capacitor 504 connects between the input node 502 and the automatic clamping circuit portion 525. The automatic clamping portion 525 connects to the customizable clamping circuit portion 527 which couples to buffer 528. The automatic clamping circuit portion 525 includes a comparator 518 having a first input coupled to a first level shift circuit 506 which couples to receive a first clamp pulse signal at a first reference voltage $V_{ref1}$. A second level shift circuit 516 couples between the second input of the comparator 518 and the clamping capacitor 504. Transistor 520 includes a gate coupled to the output of comparator 518, a source coupled to the power supply, and a drain coupled to the clamping capacitor 504. Further, current source 522 connects between the clamping capacitor 504 and ground.

The customizable clamping portion 527 of the second embodiment 500 is similar to that of the first embodiment 400. The customizable clamping portion 527 includes transistor 526 having a gate that couples to a second clamping pulse signal having a second reference voltage $V_{ref2}$, a source that couples to ground and a drain that couples to clamping capacitor 504. Buffer 528 connects to output node 530.

The first level shift circuit 506 includes a transistor 510 having a drain coupled to ground, a gate coupled to a first clamping pulse signal having a first reference voltage $V_{ref1}$, and a source coupled to a current source 508 for supplying current. The source of transistor 510 also connects to the first input of comparator 518.

The second level shift circuit 516 includes a transistor 514 having a drain coupled to ground, a gate coupled to a first clamping pulse signal having a first reference voltage $V_{ref1}$, and a source coupled to a current source 512 for supplying current. The source of transistor 514 also connects to the second input of comparator 518.

In operation, during the automatic clamping mode, the incoming video signal and ground level are level-shifted and compared. Comparator 518 includes hysteresis and controls transistor 520. Comparator 518 senses the voltage at node B. If the voltage is lower than the comparator reference voltage $V_{ref1}$, then comparator 518 turns on transistor 520 to charge clamping capacitor 504. Since the first and second level shift circuits, 506 and 516, include source follower arrangements as explained, clamping circuit 500 operates even if the video input signal is lower than ground. When the video input signal level is lower than the ground, the output of comparator 518 turns transistor 520 on and a charge current is delivered to the clamping capacitor 504 to restore the DC level through transistor 520. When the video signal level is higher than ground level, transistor 520 turns off. Therefore, the lowest video signal level, the sync tip, can be clamped to the ground. The system incorporating the clamping circuit acquires the sync tip at this point and, depending upon the application, the automatic clamping mode can be disabled and customizable clamping mode can be initiated. Current source 522 provides a very small leakage current to discharge the clamping capacitor 504 which prevents signal saturation when capacitor 504 is charged above the lowest level of the input video signal to exceed the clamping pulse signal reference voltage $V_{ref1}$, MOS transistor 520 can be tuned to provide any desired time constant to charge the clamping capacitor 504. When the input video signal approaches the ground level, resistance of transistor 520 increases and, as a result, the overall time constant increases. Hysteresis implemented in comparator 518 prevents oscillation during the clamping operation along with varying the charging time constant.

After the synchronization acquisition, the system in which the clamping circuit 500 is installed may enable the customizable clamping mode by sending a second clamping pulse signal for clamping during any desired period such as front porch or back-porch (pedestal). Thereby, the clamp operation would be disabled during vertical blanking period. Transistor 526 shorts node B to ground, thus the output node 530 is clamped to ground or the clamp reference voltage $V_{ref2}$. In this mode of operation, no leakage current is needed to discharge the clamping capacitor 504. Furthermore, during this mode, clamping circuit 500 updates the DC level during every clamp pulse period. Buffer 528 provides the output to an analog-to-digital converter (ADC—not shown) to be digitized or to a DSP (not shown) to be processed.

Figure 5B:
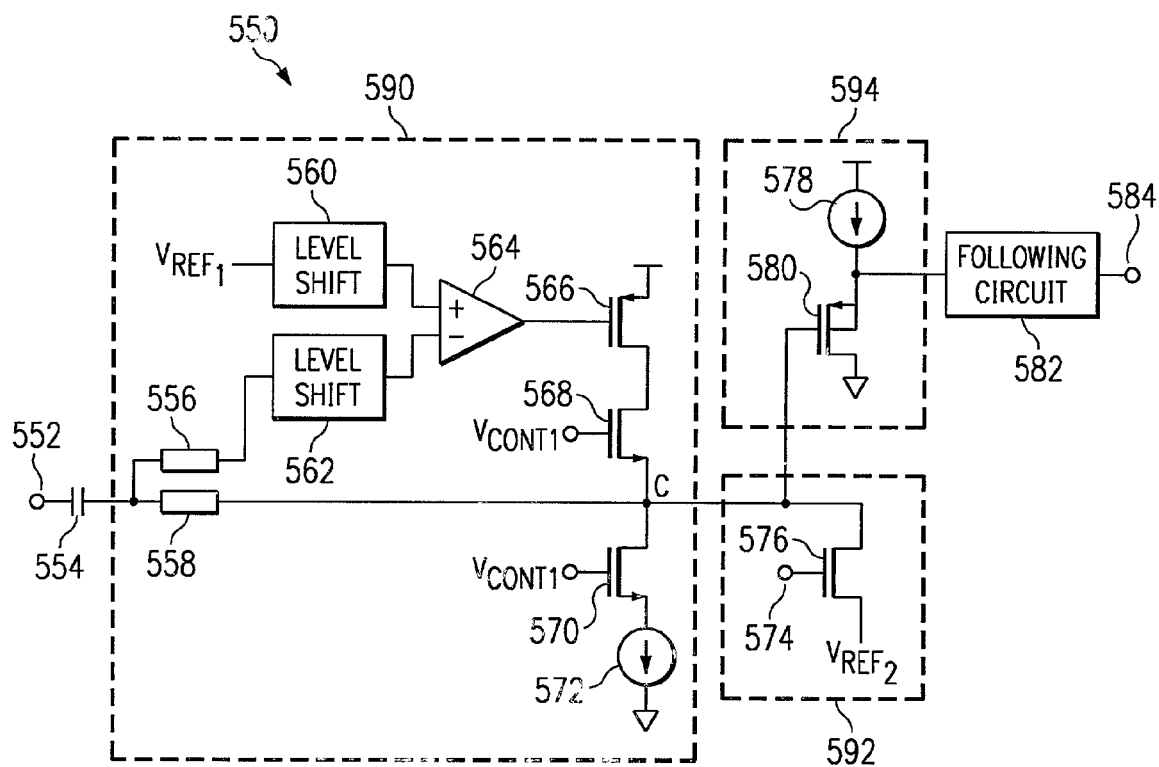
FIG. 5b illustrates a third embodiment of a clamping circuit in accordance with the present invention.

FIG. 5b discloses a third embodiment of a clamping circuit 550 in accordance with the present invention, wherein the clamping capacitor 554 connects between the input node 552 and the automatic clamping circuit portion 590. The automatic clamping portion 590 connects to the customizable clamping circuit portion 592 which couples to buffer 594. The automatic clamping circuit portion 590 includes a comparator 564 having a first input coupled to a first level shift circuit 560 which couples to ground. A first resistive element 556 connects to the clamping capacitor 554. Comparator 564 includes a first input connected to a first level shift circuit 560 that connects to ground. Comparator 564 also includes a second input connected to a second level shift circuit 562 which connects to the first resistive element 556. A first transistor 566 includes a gate couples to the output of the comparator 564 and a source coupled to the power supply $V_{DD}$. A second transistor 568 includes a gate couples to receive a first clamping pulse signal $V_{ref1}$, the drain coupled to drain of the first transistor 566. A second resistive element 558 coupled between the clamping capacitor 554 and the source of the second transistor 568. A third transistor 570 includes a gate couples to receive the first clamping pulse signal $V_{ref1}$ and a drain couples to the second resistive element 558. A current source 576 couples between the source of the third transistor 570 and ground.

The customizable clamping portion 592 of the third embodiment 550 is similar to that of the first embodiment 400. The customizable clamping portion 592 includes transistor 576 having a gate that couples to a second clamping pulse signal having a second reference voltage $V_{ref2}$, a source that couples to ground and a drain that couples to resistive element 558. Buffer 594 connects to output node 584. Buffer 594 includes transistor 580 having a gate coupled to resistive element 558, a drain coupled to ground and a source coupled to a following circuit 582 and a current source 578.

The first level shift circuit 506 and second level shift circuit 562 may be implemented similar to that of the first and second level shift circuits, 506 and 516, of FIG. 5a.

In operation, during the automatic clamping mode, the incoming video signal and ground level are level-shifted and compared. Comparator 564 includes hysteresis and controls transistor 566. Since the first and second level shift circuits, 560 and 562, include source follower arrangements as detailed for FIG. 5a, clamping circuit 550 operates even if the input video signal is lower than ground. When the video signal level is lower than the ground, the output of comparator 564 turns transistor 566 on and a charge current is delivered to the clamping capacitor 554 to restore the DC level through transistors, 566 and 568, and resistive element 558. When the video signal level is higher than ground level, transistor 566 turns off. Therefore, the lowest video signal level, the sync tip, can be clamped to the ground. The system incorporating the clamping circuit acquires the sync tip at this point and, depending upon the application, the automatic clamping mode can be disabled and customizable clamping mode can be initiated. Current source 572 provides a very small leakage current to discharge the clamping capacitor 554 which prevents signal saturation when capacitor 554 is charged above the lowest level of the input video signal to exceed the clamping pulse signal reference voltage $V_{ref1}$. MOS transistors, 566 and 576, and resistive element 558 can be tuned to provide any desired time constant to charge the clamping capacitor 554. When the input video signal approaches the ground level, resistance of transistor 566 increases and, as a result, the overall time constant increases. Hysteresis implemented in comparator 564 prevents the oscillation during the clamping operation along with varying the charging time constant. Each resistive elements, 556 and 558, can be implemented using a resistor such as a poly resistor, MOS resistor, etc.

After the synchronization acquisition, the system in which the clamping circuit is installed may enable the customizable clamping mode by sending a second clamping pulse signal for clamping during any desired period such as front porch or back-porch (pedestal). Thereby, the clamp operation would be disabled during vertical blanking period. Transistor 576 shorts node C to ground, thus the output node 584 is clamped to ground or the clamp reference voltage $V_{ref2}$. In this mode of operation, no leakage current is needed to discharge the clamping capacitor 554. Furthermore, during this mode, clamping circuit 550 updates the DC level during every clamp pulse period. Buffer 594 includes source follower 582 which provides the output to an ADC (not shown) to be digitized or to a DSP (not shown) to be processed.

Figure 6:
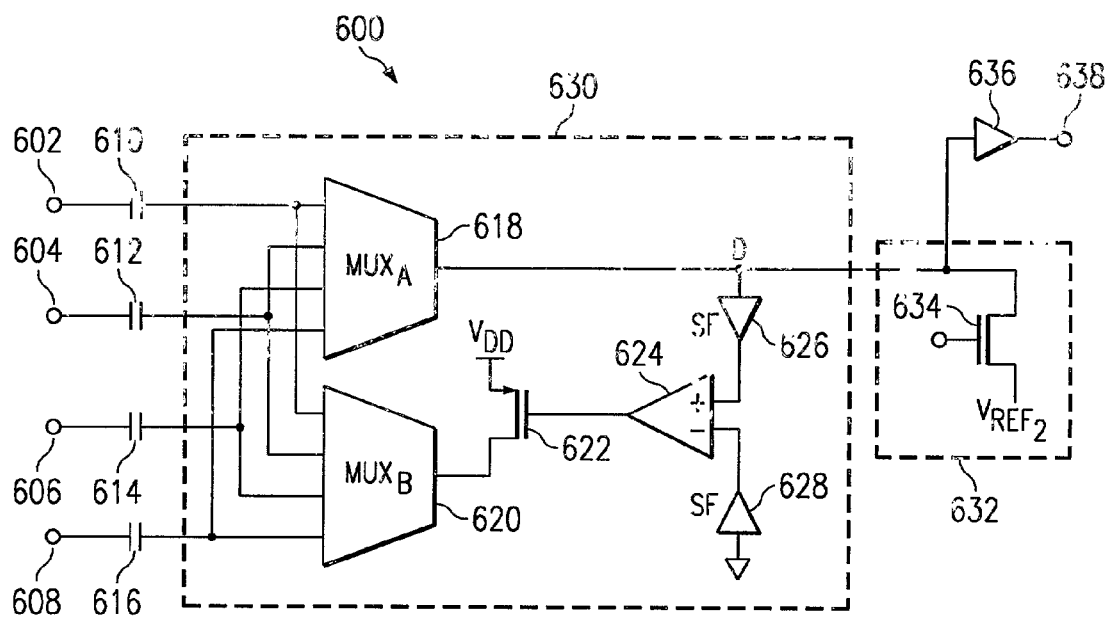
FIG. 6 displays a fourth embodiment of a clamping circuit in accordance with the present invention.

In yet another embodiment, as shown in FIG. 6, the automatic clamping circuit 630 includes a first multiplexing circuit portion 618 connects between clamping capacitors 610–616 and the output node 638. For many applications, a multiplexer 618 is integrated at the input of the video processing circuit 600. The comparator arrangement disclosed in the prior embodiments may introduce oscillations when a multiplexed input signal is applied due to the turning on and off of clamp charge current. In this embodiment, the switch impedance of multiplexers, 618 and 620, is incorporated in two separate paths during automatic clamping mode operation: the sense path and in the charge path. A first level shift circuit 626 connects to the first multiplexing circuit portion 618. Comparator 624 including a first input connecting to the first level shift circuit 626. A second level shift circuit 628 couples between the second input of the comparator 624 and ground. A first transistor 622 includes a gate connected to the output of the comparator 624 and a source connected to the power supply $V_{DD}$. A second multiplexing circuit portion 620 connects between the drain of the first transistor 622 and clamping capacitors 610–616.

The customizable clamping portion 632 of the fourth embodiment 600 is similar to that of the first embodiment 400. The customizable clamping portion 632 includes transistor 634 having a gate that couples to a second clamping pulse signal having a second reference voltage $V_{ref2}$, a source that couples to ground and a drain that couples to resistive element the first multiplexing circuit portion 618. Buffer 636 connects to output node 638.

The first level shift circuit 626 and second level shift circuit 628 may be implemented similar to that of the first and second level shift circuits, 506 and 516, of FIG. 5A.

In operation, during the automatic clamping mode, the incoming video signal and ground level are level-shifted and compared. Comparator 624 includes hysteresis and controls transistor 622. Since the first and second level shift circuits, 626 and 628, include source follower arrangements as explained, clamping circuit 600 operates even if the input video signal is lower than ground. When the video signal level is lower than the ground, the output of comparator 624 turns transistor 622 on and a charge current is delivered to the respective clamping capacitor 610–616 to restore the DC level through transistor 622. When the video signal level is higher than ground level, transistor 622 turns off. Therefore, the lowest video signal level, the sync tip, can be clamped to the ground. The system incorporating the clamping circuit acquires the sync tip at this point and, depending upon the application, the automatic clamping mode can be disabled and customizable clamping mode can be initiated. MOS transistor 622 can be tuned to provide any desired time constant to charge each one of the respective clamping capacitors 610–616. When the input video signal approaches ground level, resistance of transistor 622 increases and, as a result, the overall time constant increases. Hysteresis implemented in comparator 624 prevents the oscillation during the clamping operation along with varying the charging time constant.

After the synchronization acquisition, the system in which the clamping circuit 600 is installed may enable the customizable clamping mode by sending a second clamping pulse signal for clamping during any desired period such as front porch or back-porch (pedestal). Thereby, the clamp operation would be disabled during vertical blanking period. Transistor 634 shorts node D to ground, thus the output node 638 is clamped to ground or the clamp reference voltage $V_{ref2}$. In this mode of operation, no leakage current is needed to discharge each respective clamping capacitors, 610–616. Furthermore, during this mode, clamping circuit 600 updates the DC level during every clamp pulse period. Buffer 636 provides the output to an ADC (not shown) to be digitized or to a DSP (not shown) to be processed.

Advantages of this design include but are not limited to a clamping circuit having two modes of operation which include both a bottom level and mid-level clamping mode but also to a clamping circuit having no feedback loop. Furthermore, the clamping circuit provides a consistent supply of leakage current and corrects the DC level without causing line noise. Also, the clamping circuit allows maximum dynamic range to the input. This clamping circuit eliminates the need for a voltage reference circuit such that the reference voltage may be as low as ground. Moreover, multiplexed input may be connected to the clamping circuit without causing any oscillation issues.

The present invention finds application in a great many video systems including digital still cameras, digital video cameras, digital video processing systems, CCD signal processors, and CMOS imagers, in a variety of industrial, medical, and military sensor and imaging applications.

The present invention provides significant advantages over conventional architectures including digital programmability, fine resolution, and compatibility for both continuous time and discrete time programmable gain amplifiers.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A clamping circuit having an input node, an output node, and a power supply, comprising:
   a clamping capacitor coupled to the input node, the input node coupled to receive a video input signal;
   an automatic clamping circuit portion coupled to the clamping capacitor to automatically clamp the synchronization pulse of the video input signal to a first predetermined reference voltage of a first clamping pulse signal;
   a customizable clamping circuit portion coupled to the automatic clamping portion to clamp any portion of the video input signal to a second predetermined reference voltage of a second clamping pulse signal; and
   a buffer coupled between to the customizable clamping circuit portion and the output node,
   wherein the automatic clamping circuit portion comprises:
   a comparator having a first and second input, and an output;
   a first level shift circuit coupled between the first input of the comparator and a reference voltage input;
   a second level shift circuit coupled between the second input of the comparator and the clamping capacitor;
   a first transistor, having a gate, a drain, and a source, the gate coupled to the output of the comparator, the source coupled to the power supply, the drain coupled to the clamping capacitor; and
   a current source coupled between the clamping capacitor and ground.

2. The clamping circuit as recited in claim 1, wherein the first level shift circuit comprises:
   a second current source; and
   a second transistor, having a gate, a drain, and a source, the gate coupled to receive the first clamping pulse signal, the source coupled to the second current source and the first input of the comparator, the drain coupled to ground.

3. The clamping circuit as recited in claim 1, wherein the second level shift circuit comprises:
   a second current source; and
   a second transistor, having a gate, a drain, and a source, the gate coupled to receive the first clamping pulse signal, the source coupled to the second current source and the second input of the comparator, the drain coupled to ground.

4. The clamping circuit as recited in claim 1, wherein the automatic clamping circuit portion comprises:
   a comparator having a first and second input, and an output;
   a first level shift circuit coupled between the first input of the comparator and ground;
   a first resistor coupled to the clamping capacitor;
   a second level shift circuit coupled between the first resistor and the second input of the comparator;
   a first transistor, having a gate, a drain, and a source, the gate coupled to the output of the comparator, the source coupled to the power supply;
   a second transistor, having a gate, a drain, and a source, the gate coupled to receive the first clamping pulse signal, the drain coupled to the drain of the first transistor;
   a second resistor coupled between the clamping capacitor and the source of the second transistor;
   a third transistor, having a gate, a drain, and a source, the gate coupled to receive the first clamping pulse signal, the drain coupled to the second resistor; and
   a current source coupled between the source of the third transistor and ground.

5. The clamping circuit as recited in claim 4, wherein the first level shift circuit comprises:
   a second current source; and
   a fourth transistor, having a gate, a drain, and a source, the gate coupled to the first clamping pulse signal, the source coupled to the second current source and the first input of the comparator, the drain coupled to ground.

6. The clamping circuit as recited in claim 4, wherein the second level shift circuit comprises:
   a second current source; and
   a fourth transistor, having a gate, a drain, and a source, the gate coupled to the first clamping pulse signal, the source coupled to the second current source and the second input of the comparator, the drain coupled to ground.

7. The clamping circuit as recited in claim 1, wherein the automatic clamping circuit portion comprises:
   a first multiplexing circuit portion coupled between the clamping capacitor and the output node;
   a first level shift circuit coupled to the first multiplexing circuit portion;
   a comparator having a first and second input, and an output, the first input coupled to the first level shift circuit;
   a second level shift circuit coupled between the second input of the comparator and ground;
   a first transistor, having a gate, a drain, and a source, the gate coupled to the output of the comparator, the source coupled to the power supply; and
   a second multiplexing circuit portion coupled between the drain of the first transistor and the clamping capacitor.

8. The clamping circuit as recited in claim 7, wherein the first level shift circuit comprises:
   a second current source; and
   a second transistor, having a gate, a drain, and a source, the gate coupled to the first clamping pulse signal, the source coupled to the second current source and the first input of the comparator, the drain coupled to ground.

9. The clamping circuit as recited in claim 7, wherein the second level shift circuit comprises:
   a second current source; and
   a second transistor, having a gate, a drain, and a source, the gate coupled to the first clamping pulse signal, the source coupled to the second current source and the second input of the comparator, the drain coupled to ground.

* * * * *